US011055618B2

(12) United States Patent
Baughman et al.

(10) Patent No.: US 11,055,618 B2
(45) Date of Patent: *Jul. 6, 2021

(54) WEIGHT ADJUSTED COMPOSITE MODEL FOR FORECASTING IN ANOMALOUS ENVIRONMENTS

(71) Applicant: International Business Machines Corporation, Armonk, NY (US)

(72) Inventors: Aaron K. Baughman, Silver Spring, MD (US); James R. Kozloski, New Fairfield, CT (US); Cameron N. Mcavoy, RTP, NC (US); Brian M. O'Connell, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 163 days.

This patent is subject to a terminal disclaimer.

(21) Appl. No.: 16/390,830

(22) Filed: Apr. 22, 2019

(65) Prior Publication Data

US 2019/0251472 A1 Aug. 15, 2019

Related U.S. Application Data

(63) Continuation of application No. 14/536,817, filed on Nov. 10, 2014, now Pat. No. 10,373,068.

(51) Int. Cl.
*G06N 5/02* (2006.01)
*G06N 20/00* (2019.01)

(52) U.S. Cl.
CPC ............... *G06N 5/02* (2013.01); *G06N 20/00* (2019.01)

(58) Field of Classification Search
CPC ...... G06N 99/005; G06N 5/025; G06N 7/005; G06K 9/6256; G06K 9/6269
See application file for complete search history.

(56) References Cited

U.S. PATENT DOCUMENTS 7,610,214 B1 * 10/2009 Dwarakanath ..... G06Q 30/0202
705/7.31
7,987,106 B1 * 7/2011 Aykin .................. G06Q 10/063
705/7.11

(Continued)

OTHER PUBLICATIONS

Combining Forecasts J. Scott Armstrong (Year: 2001).*

(Continued)

*Primary Examiner* — Kakali Chaki
*Assistant Examiner* — Ababacar Seck
(74) *Attorney, Agent, or Firm* — Garg Law Firm, PLLC; Rakesh Garg; Anthony V England (57) ABSTRACT

A method, system, and computer program product for weight adjusted composite model for forecasting in anomalous environments are provided in the illustrative embodiments. A base forecasting model and a second forecasting model are combined to form a composite model, the base forecasting model configured to forecast an event in a time series, the second forecasting model configured to represent an anomalous portion of data in the time series. A mixing algorithm is combined with the composite model to adjust a set of weights associated with the composite model. Upon identifying a future period in which the event is to be forecasted, using the mixing algorithm, a subset of the set of weights is adjusted to from a weight adjusted composite model. The weight adjusted composite model is executed to forecast the event in the future period.

18 Claims, 8 Drawing Sheets

(56) References Cited

U.S. PATENT DOCUMENTS

2006/0247859 A1* 11/2006 Ladde .................... G06Q 10/00
702/3
2009/0319310 A1* 12/2009 Little ................. G06Q 30/0202
705/7.31
2011/0035071 A1* 2/2011 Sun .......................... H02J 3/00
700/291

OTHER PUBLICATIONS

Time Series Forecasting With Multiple Candidate Models: Selecting or Combining? Lean et al. (Year: 2005).*
Metaforecasting: Ways of Improving Forecasting. Accuracy and Usefulness by Spyros Makridakis (Year: 1987).*
List of All IBM Related Applications, Appendix P, 2019.

* cited by examiner

WEIGHT ADJUSTED COMPOSITE MODEL FOR FORECASTING IN ANOMALOUS ENVIRONMENTS

TECHNICAL FIELD

The present invention relates generally to a method, system, and computer program product for forecasting future events. More particularly, the present invention relates to a method, system, and computer program product for weight adjusted composite model for forecasting in anomalous environments.

BACKGROUND

A predictive model (forecasting model, autoregressive model) is a software-implemented model of a system, process, or phenomenon, usable to forecast a value, output, or outcome expected from the system, process, or phenomenon. The system, process, or phenomenon that is modeled is collectively and interchangeably referred to hereinafter as a "process" unless specifically distinguished where used.

A simulation is a method of computationally looking ahead in the future of the execution of the process to predict one or more events that can be expected to occur in the process at that future time. A predicted event is a value, output, or outcome of the process at the end of a look-ahead period configured in the simulation.

A variable that affects an outcome of a process is called a factor or a feature. A predicted event or an outcome of a process is dependent upon, affected by, or otherwise influenced by a set of one or more factors. A factor can be independent, to wit, independent of and not affected by other factors participating in a given model. A factor can be dependent upon a combination of one or more other independent or dependent factors.

A predictive model has to be trained before the model can reliably predict an event in the future of the process with a specified degree of probability or confidence. Usually, but not necessarily, the training data includes past or historical outcomes of the process. The training process adjusts a set of one or more parameters of the model.

Data emitted by a data source is also called a time series. In statistics, signal processing, and many other fields, a time series is a sequence of data points, measured typically at successive times, spaced according to uniform time intervals, other periodicity, or other triggers.

Time series analysis is a method of analyzing time series, for example to understand the underlying context of the data points, such as where they came from or what generated them. As another example, time series analysis may analyze a time series to make forecasts or predictions. Time series forecasting is the use of a model to forecast future events based on known past events, to wit, to forecast future data points before they are measured. An example in econometrics is the opening price of a share of stock based on the stock's past performance, which uses time series forecasting analytics.

Time series forecasting uses one or more forecasting models to regress on independent factors to produce a dependent factor. For example, if Tiger Woods has been playing golf very quickly, the speed of play is an example of an independent factor. A forecasting model regresses on historical data to predict the future play rates. The future play rate is a dependent factor.

The illustrative embodiments recognize that time series data is not always uniformly distributed, and includes anomalies. For example, if the data pertains to a golfing tournament, the events that occur in the tournament are reflected in the data. The type, spacing, peaking, repetition rate, intensity, duration, and other characteristics of the events are dependent on a variety of factors, and are therefore non-uniformly distributed in the data.

The non-uniformity of the distribution of an event in time series data is referred to herein as an anomaly. For example, that an event in the example golfing data will have a certain value is dependent upon a time of day when that event is occurring, the slope of the course, a weather condition at the time, a skill level of the player, and many other factors that introduce anomalies in the event's data. For example, the event may occur more regularly during midday as compared to evenings; or the event may occur more predictably if a skilled player is playing as compared to when a novice is playing; and so on.

The illustrative embodiments recognize that presently available forecasting models are good at forecasting events when they are uniformly distributed in a time series but are often inaccurate when forecasting those events in anomalous data. Anomalous data is time series data that includes one or more anomalies.

The illustrative embodiments further recognize that not only does an anomaly disturb the uniformity of a given time series data, an anomalous portion of that data itself has variability. In other words, the illustrative embodiments recognize that to forecast an event during an anomalous portion of a future time series, one has to also know which segment of that future portion is being forecasted.

For example, suppose that training data shows that an anomaly causes an event to occur with a linearly increasing value from 8 to 32 during an anomalous period of three hours from noon until 3 PM during an otherwise uniform time series for the remainder of twenty one hours. If the event is to be forecasted during a day next week, to accurately forecast the event during 2-3 PM, one has to know the anomalous behavior of the event not only between noon and 3 PM, but particularly during the 2-3 PM segment of that anomalous period because the anomalous values of the event are different within different segments of the anomalous period as well.

The linear anomaly is described only as a simplified example of anomalous data. The illustrative embodiments recognize that the anomaly in the data can be far more complex, such that a polynomial equation in n-degree is needed to suitably model the anomaly curve. In such cases, not only is the polynomial representation of the anomaly important, but how that polynomial expression changes in different segments of the anomaly curve is important as well.

The illustrative embodiments have already recognized that presently available forecasting models are inaccurate when forecasting events in anomalous data. The illustrative embodiments further recognize that forecasting events in specific segments of anomalous data is even more challenging, and unavailable in presently available forecasting models.

SUMMARY

The illustrative embodiments provide a method, system, and computer program product for motion pattern based event detection using a wearable device. An embodiment includes a method for event forecasting in anomalous environments. The embodiment combines with a base forecasting model a second forecasting model to form a composite model, the base forecasting model configured to forecast an event in a time series, the second forecasting model configured to represent an anomalous portion of data in the time series. The embodiment combines with the composite model a mixing algorithm, the mixing algorithm configured to adjust a set of weights associated with the composite model. The embodiment adjusts, responsive to identifying a future period in which the event is to be forecasted, using the mixing algorithm, a subset of the set of weights to from a weight adjusted composite model. The embodiment executes, using a processor and a memory, the weight adjusted composite model to forecast the event in the future period. Thus, where the prior-art fails to recognize and act upon anomalies in time series data, the embodiment recognizes the anomalies, and provides a methodology that produces more accurate forecasts as compared to the prior-art in such anomalous environments.

Another embodiment further identifies a characteristic of the future period. The embodiment identifies a second period in a training data, wherein the characteristic of the future period matches a corresponding characteristic of the second period within a threshold. The embodiment determines a portion of a curve representing a set of anomalous values in the training data during the second period, wherein the adjusting matches a curve representing the composite model during the future period with the portion of the curve representing the set of anomalous values in the training data during the second period. Thus, where the prior-art fails to recognize and act upon anomalies in time series data, the embodiment recognizes the anomalies during certain periods, and provides a methodology that produces more accurate forecasts during those periods or portions thereof, as compared to the prior-art in such anomalous environments.

In another embodiment, the training data comprises past data of the time series. Thus the embodiment can be trained to produce event forecasts in anomalous data environments.

In another embodiment the characteristic comprises a factor that affects the event during the future period. Thus the embodiment can be configured to account for various factors that affect event forecasting in anomalous data environments.

In another embodiment the characteristic comprises a time of day. Thus the embodiment can be configured to account for a time-related factor that affects event forecasting in anomalous data environments.

In another embodiment the second forecasting model comprises an equation whose curve fits, within a threshold, a curve formed by a set of values in the anomalous portion, and wherein the base forecasting model forecasts a value of the event in a non-anomalous portion of the data of the time series. Thus the embodiment can be configured to produce accurate event forecasting during anomalous and non-anomalous periods in a given environment.

Another embodiment further configures the set of weights in the composite model, wherein a weight in the set of weights is associated with an expression in an equation in the composite model, wherein adjusting the weight causes a curve of the equation to change and form a changed curve, and wherein the changed fits, within a threshold, a second curve formed by a set of values in an expected anomalous portion in the time series during the future period.

Another embodiment includes a computer program product for event forecasting in anomalous environments. The embodiment further includes one or more computer-readable tangible storage devices. The embodiment further includes program instructions, stored on at least one of the one or more storage devices, to combine with a base forecasting model a second forecasting model to form a composite model, the base forecasting model configured to forecast an event in a time series, the second forecasting model configured to represent an anomalous portion of data in the time series. The embodiment further includes program instructions, stored on at least one of the one or more storage devices, to combine with the composite model a mixing algorithm, the mixing algorithm configured to adjust a set of weights associated with the composite model. The embodiment further includes program instructions, stored on at least one of the one or more storage devices, to adjust, responsive to identifying a future period in which the event is to be forecasted, using the mixing algorithm, a subset of the set of weights to from a weight adjusted composite model. The embodiment further includes program instructions, stored on at least one of the one or more storage devices, to execute, using a processor and a memory, the weight adjusted composite model to forecast the event in the future period. Thus, where the prior-art fails to recognize and act upon anomalies in time series data, the embodiment recognizes the anomalies, and provides a methodology that produces more accurate forecasts as compared to the prior-art in such anomalous environments.

Another embodiment includes a computer system for event forecasting in anomalous environments. The embodiment further includes one or more processors, one or more computer-readable memories and one or more computer-readable storage devices. The embodiment further includes program instructions, stored on at least one of the one or more storage devices for execution by at least one of the one or more processors via at least one of the one or more memories, to combine with a base forecasting model a second forecasting model to form a composite model, the base forecasting model configured to forecast an event in a time series, the second forecasting model configured to represent an anomalous portion of data in the time series. The embodiment further includes program instructions, stored on at least one of the one or more storage devices for execution by at least one of the one or more processors via at least one of the one or more memories, to combine with the composite model a mixing algorithm, the mixing algorithm configured to adjust a set of weights associated with the composite model. The embodiment further includes program instructions, stored on at least one of the one or more storage devices for execution by at least one of the one or more processors via at least one of the one or more memories, to adjust, responsive to identifying a future period in which the event is to be forecasted, using the mixing algorithm, a subset of the set of weights to from a weight adjusted composite model. The embodiment further includes program instructions, stored on at least one of the one or more storage devices for execution by at least one of the one or more processors via at least one of the one or more memories, to execute, using a processor and a memory, the weight adjusted composite model to forecast the event in the future period. Thus, where the prior-art fails to recognize and act upon anomalies in time series data, the embodiment recognizes the anomalies, and provides a methodology that produces more accurate forecasts as compared to the prior-art in such anomalous environments.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments used to describe the invention generally address and solve the above-described problems and other problems related to forecasting events in anomalous time series data. The illustrative embodiments provide a method, system, and computer program product for weight adjusted composite model for forecasting in anomalous environments.

An embodiment can be implemented as software instructions of an application. The application can be executed on any suitable data processing system.

An embodiment selects a base forecasting model. A base forecasting model (base model) is a forecasting model that is configured to forecast events when there are no anomalies in the data. In some cases, a pre-existing forecasting model can be trained using training data of a time series to forecast events in future data of the time series.

Furthermore, the training data can be but need not necessarily be historical data of the same time series in which a future event is to be predicted. For example, an embodiment can be configured such that the base model uses time series data as it comes in, to train or retrain a previously existing base model.

Only as an example, and without implying any limitation thereto, consider an example pre-existing base model that conforms to a parabolic curve with a certain slope and apex values. In other words, the example pre-existing base model is a quadratic equation with those slope and apex values. Training the base model with some training data can modify the slope, the apex, or shift when the apex appears to fit an example parabolic curve of the training data. Of course, other curves with other characteristics and representable as one or more polynomial equations in any degree are similarly usable and trainable as the base model within the scope of the illustrative embodiments.

The embodiment identifies an anomaly in the training data. The embodiment configures a second model so that the second model fits the curve of the event values in the anomalous portion of the training data.

Only as an example and without implying any limitation thereto, consider an example second model that conforms to a cosine curve. The cosine curve of the second model may have a fixed frequency, a variable frequency, a fixed amplitude, a variable amplitude, or some combination thereof. Configuring the second model to fit the anomaly can modify the frequency, the amplitude, or a combination thereof, in some or all segments of the cosine curve. Of course, other curves with other characteristics and representable as one or more polynomial equations in any degree are similarly usable and configurable as the second model within the scope of the illustrative embodiments.

Training a base model or configuring a second model in the manner described above modifies one or more polynomial equations. The modifications include but are not limited to changing, adding, deleting, or otherwise manipulating a constant in an equation, an exponent in an equation, an operation in an equation, the bounds or range of an equation, a condition in a combination of equations, or some combination thereof.

An embodiment further combines the trained base model and the configured second model using a mixing algorithm. A mixing algorithm includes but is not limited to a single polynomial equation in any degree, a set of polynomial equations in any degrees, a set of one or more constants, a set of one or more conditions, logic, or a combination thereof. Hereinafter, a mixing algorithm is interchangeably referred to as a mixing algorithm or a mixing equation, unless expressly distinguished proximate to where the term is used.

A mixing algorithm manipulates the combination of the trained base model and the configured second model (hereinafter, "composite model"). Particularly, the mixing algorithm adjusts one or more weights in the composite model so that the composite model fits a particular future segment of a future anomalous portion in a future data of a given time series. A weight in a composite model can be a value of a constant, a value of an exponent, an operation, a value of a bound or range, a value of a condition, or some combination thereof. For example, in one simplified implementation, the mixing algorithm may change a constant in a polynomial equation in the composite model so that a slope of a curve matches a slope of a curve of the anomalous data in a particular segment of the anomalous data.

An embodiment uses the composite model together with the mixing algorithm to forecast events in a future time series such that the accuracy of the forecasted values remain within a threshold variation in the anomalous as well as non-anomalous portions of the future time series. For example, when a forecast of a value of an event is demanded during a particular segment of an anomalous period in the future time series data, the embodiment manipulates the mixing algorithm to change one or more weights in the composite model so that the weight-adjusted composite model achieves a curve that is expected to fit the future data during that segment of that anomalous period. The embodiment then uses the weight-adjusted composite model to forecast a value of the event in that segment of that anomalous period such that the forecasted value conforms to the fitted curve.

An embodiment further compares the forecasted value of the event with an actual value of the event as and when the event occurs during that future period. If the forecasted value does not match with the actual value within a tolerance, the embodiment retrains the composite model or a part thereof, adjusts the mixing algorithm or a part thereof, or both, so that a second future forecasted value of the event during a second future period is comparatively more likely to conform within the tolerance to the second actual value of the event during that second future period.

A method of an embodiment described herein, when implemented to execute on a device or data processing system, comprises substantial advancement of the functionality of that device or data processing system in event forecasting in environments where a time series includes anomalous data. For example, where prior-art fails to recognize and act upon anomalies in time series data, an embodiment recognizes the anomalies, and provides a methodology that produces more accurate forecasts as compared to the prior-art in such anomalous environments. Operating in a manner described herein, an embodiment allows forecasting not only in anomalous portions of data but within segments of those anomalous portions with significantly better accuracy than the prior-art. Such manner of event forecasting in anomalous data is unavailable in presently available devices or data processing systems. Thus, a substantial advancement of such devices or data processing systems by executing a method of an embodiment improves the event forecasting capabilities of such devices or data processing systems while adjusting for anomalies that are observed in real world events.

The illustrative embodiments are described with respect to certain functions, equations, exponents, conditions, curves, values, events, time series data, anomalies, portions, segments, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
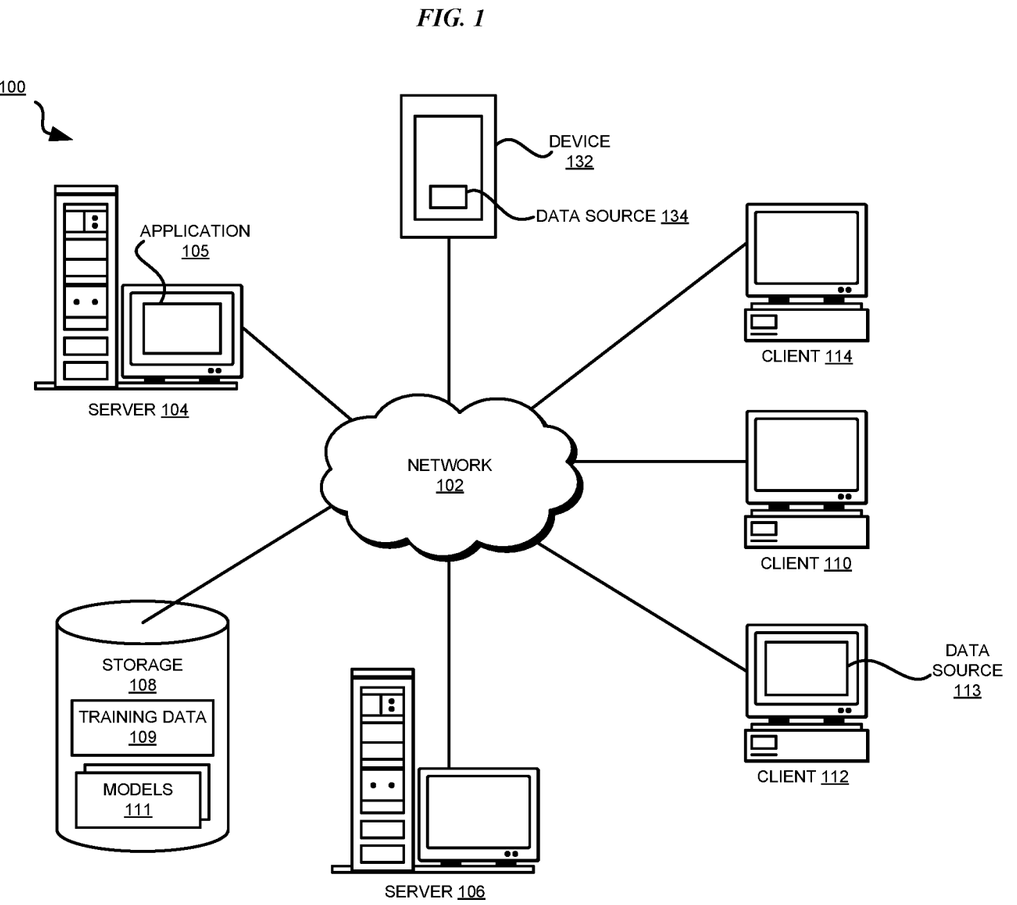
FIG. 1 depicts a block diagram of a network of data processing systems in which illustrative embodiments may be implemented.
Figure 2:
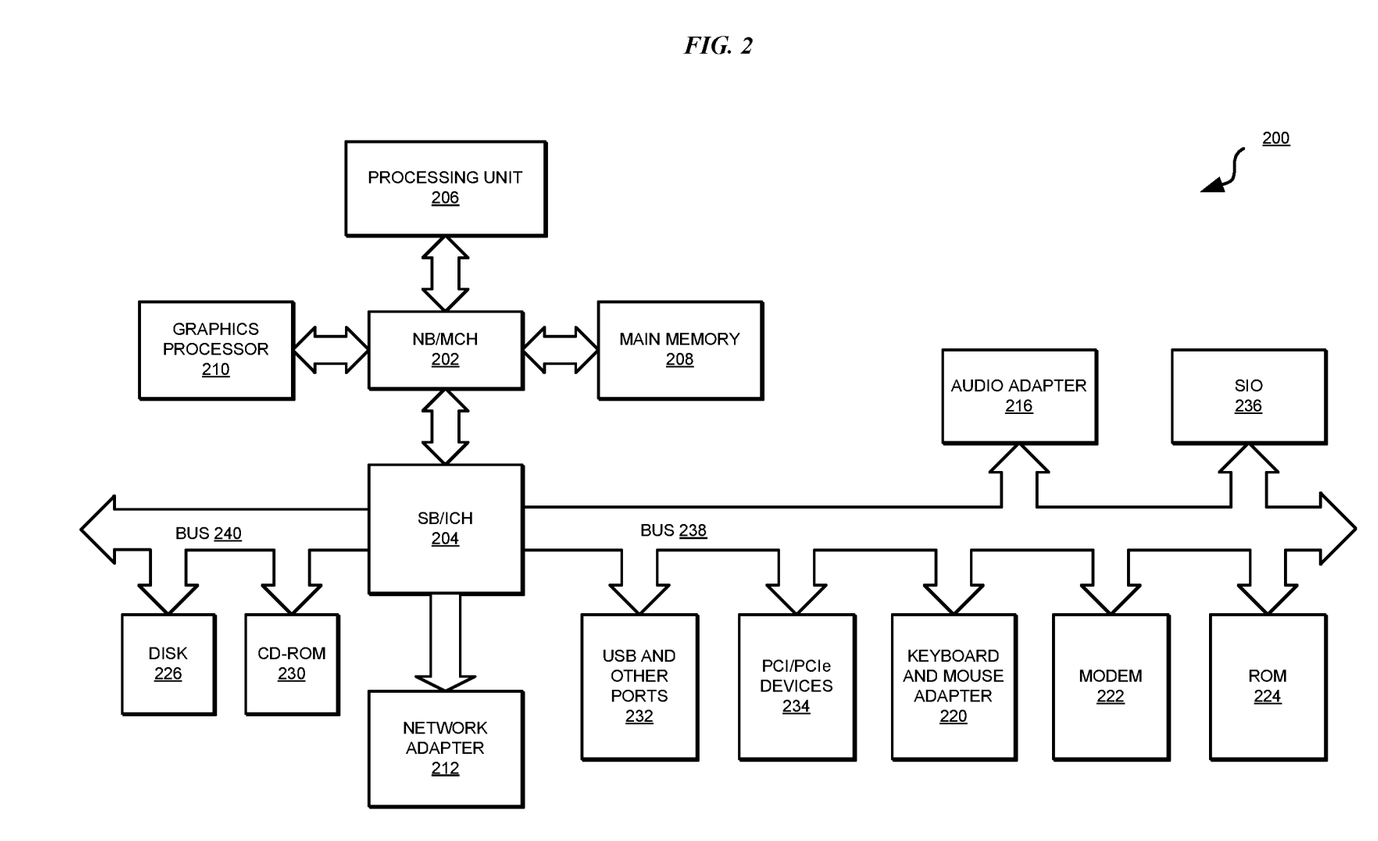
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device usable with an embodiment described herein. For example, device 132 can take the form of a smartphone, a tablet computer, a laptop computer, client 110 in a stationary or a portable form, a wearable computing device, or any other suitable device that can be configured for requesting entity reviews and analysis reports. Application 105 implements an embodiment described herein. Models 111 forms a repository of models, from which application 105 selects a pre-existing base model, and a second model. Application 105 trains a base model in models 111, to form a trained base model, using training data 109. Any number and types of data sources, such as data source 134 and data source 113, can supply one or more time series that are usable in an embodiment implemented in application 105.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
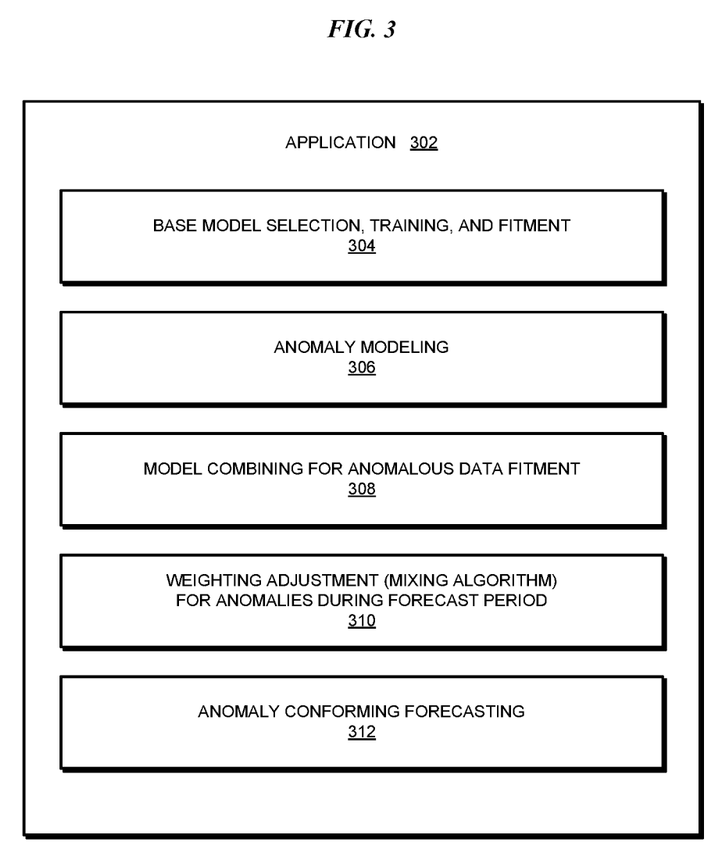
FIG. 3 depicts a block diagram of an example application for weight adjusted composite model for forecasting in anomalous environments in accordance with an illustrative embodiment.

With reference to FIG. 3, this figure depicts a block diagram of an example application for weight adjusted composite model for forecasting in anomalous environments in accordance with an illustrative embodiment. Application 302 is an example of application 105 in FIG. 3. In implementation, application 302 can be reconfigured into similarly purposed but differently configured more than one application with without departing the scope of the illustrative embodiments.

Component 304 selects a base model, e.g., from models 111 in FIG. 1. Component 304 trains the selected base model, e.g., using training data 109 in FIG. 1, so that the trained base model fits at least the non-anomalous portions of the training data.

Component 306 performs anomaly modeling. For example, component 306 identifies an anomalous portion of the training data. Component 306 selects a suitable second model that can be configured to fit the anomalous portion.

Note that there is no limitation on the number or types of anomalies that can exist in a given time series. Accordingly, when component 306 identifies more than one anomalous portion, component 306 may select one or more second models to differently configure and fit different anomalous portions.

Component 308 combines the trained base model and the configured one or more second models to form a composite model. Component 310 further combines a mixing algorithm with the composite model. Component 310 configures the mixing algorithm such that the mixing algorithm can be manipulated to perform weight adjustments in the combined algorithm.

Component 312 performs event forecasting using the composite model and the mixing algorithm. The forecasting of an event during a future period by component 312 conforms to the anomalies expected in the data during that future period, or a segment thereof. For example, to forecast an event in a segment of a future anomalous period in a time series, component 312 adjusts one or more weights in the composite model so that the resulting composite model curve fits the curve of the training time series data in a similar segment of a similar anomalous period that has passed.

Figure 4:
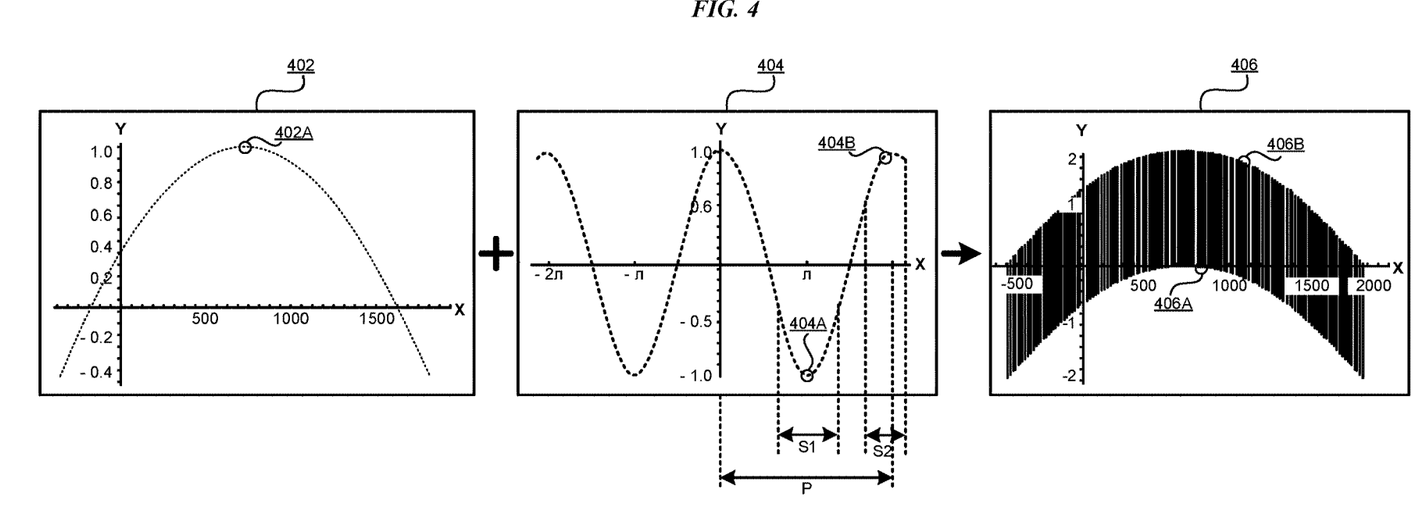
FIG. 4 depicts an example base model combined with an example second model to result in an example composite model in accordance with an illustrative embodiment.

With reference to FIG. 4, this figure depicts an example base model combined with an example second model to result in an example composite model in accordance with an illustrative embodiment. Base model 402 is selected and trained using component 304 or a similarly purposed equivalent thereof, to fit an example parabolic curve as shown.

Second model 404 is selected and configured using component 306 or a similarly purposed equivalent thereof, to fit an example cosine curve as shown. Seasonal variations in a factor affecting an event can produce such anomalies in a time series. Composite model 406 results from component 308 combining models 402 and 404.

Assume that model 406 is suitably weighted using an associated mixing algorithm for the following example. Suppose that a forecast using only model 402 forecasts the event value 402A as shown on the graph of model 402. At point 402A, the model yields a Y value of approximately 1 on the depicted scale.

Now consider two example scenarios—first, where point 404A lies in a first segment S1 of an anomalous period P, and second, where point 404B lies in a second segment S2 of the anomalous period P.

Composite model 406 shows that event value 406A during segment S1, and particularly at point 404A, is approximately zero, not approximately 1 as base model 402 would forecast. Similarly, composite model 406 shows that event value 406B during segment S2, and particularly at point 404B, is approximately 2, not approximately 1 as base model 402 would forecast.

As can be seen in this simplified example, the forecasted value of an event is dependent upon the anomalies that are expected to arise during the particular time or time segment of a future period. Therefore, the accuracy of the forecasted value is more accurate when such anomalies are considered in a weight adjusted composite model according to the illustrative embodiments.

Figure 5:
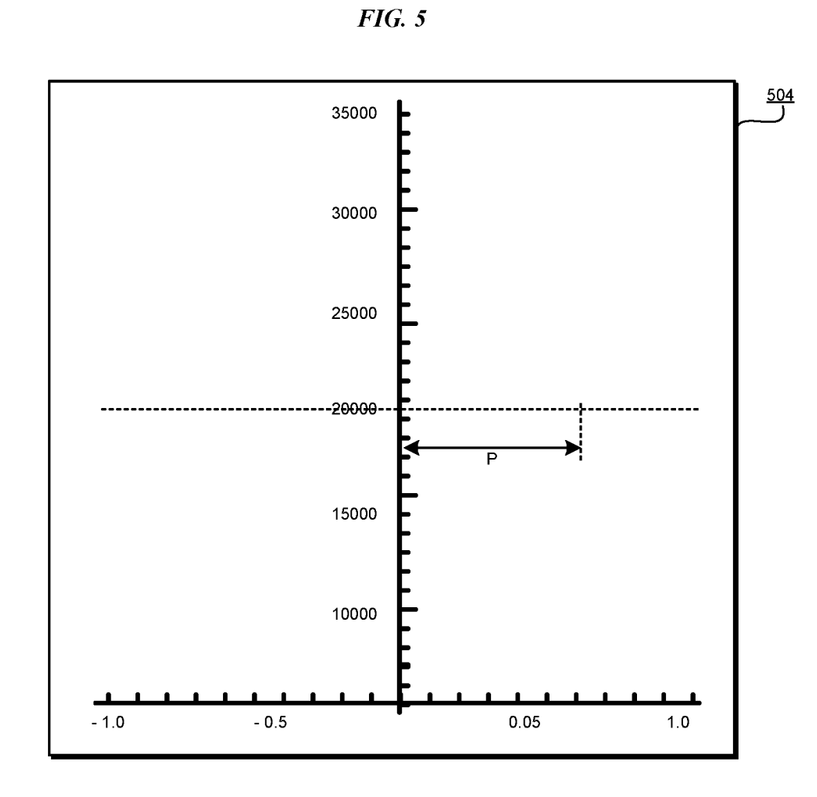
FIG. 5 depicts another example of an anomaly that can be incorporated into weight adjusted composite model for forecasting in anomalous environments in accordance with an illustrative embodiment.

With reference to FIG. 5, this figure depicts another example of an anomaly that can be incorporated into weight adjusted composite model for forecasting in anomalous environments in accordance with an illustrative embodiment. Second model 504 is usable in place of, or in addition to, second model 404 in FIG. 4.

Second model 504 can be selected and configured using component 306 or a similarly purposed equivalent thereof, to fit an example level curve as shown. A change in a level of a factor affecting an event can produce such level-type anomalies in a time series.

Combining second model 504 with base model 402 in FIG. 4 would yield a composite model (not shown) that is different from composite model 406. If the forecasted event is to appear during period P on the curve of second model 504, the level anomalies in a weight adjusted composite model (not shown) according to the illustrative embodiments would yield a more accurate value of the event as compared to just base model 402.

Figure 6:
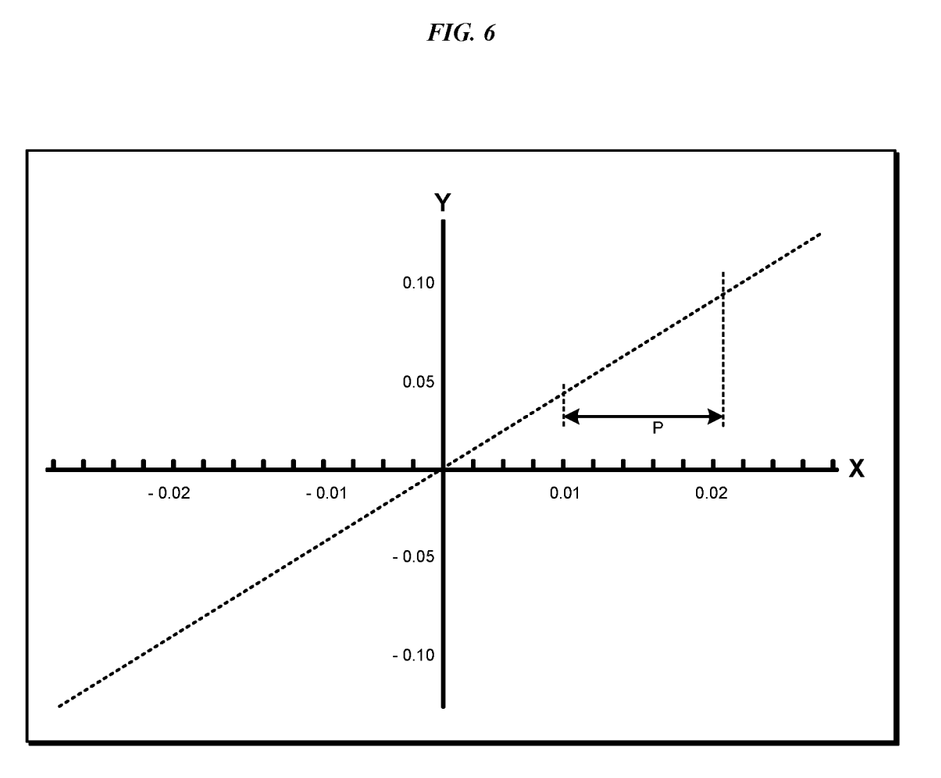
FIG. 6 depicts another example of an anomaly that can be incorporated into weight adjusted composite model for forecasting in anomalous environments in accordance with an illustrative embodiment.

With reference to FIG. 6, this figure depicts another example of an anomaly that can be incorporated into weight adjusted composite model for forecasting in anomalous environments in accordance with an illustrative embodiment. Second model 604 is usable in place of, or in addition to, second model 404 in FIG. 4 and/or second model 504 in FIG. 5.

Second model 604 can be selected and configured using component 306 or a similarly purposed equivalent thereof, to fit an example trend curve as shown. A change in a trend of a factor affecting an event can produce such trend-type anomalies in a time series.

Combining second model 604 with base model 402 in FIG. 4 would yield a composite model (not shown) that is different from composite model 406. If the forecasted event is to appear during period P on the curve of second model 604, the level anomalies in a weight adjusted composite model (not shown) according to the illustrative embodiments would yield a more accurate value of the event as compared to just base model 402.

Figure 7:
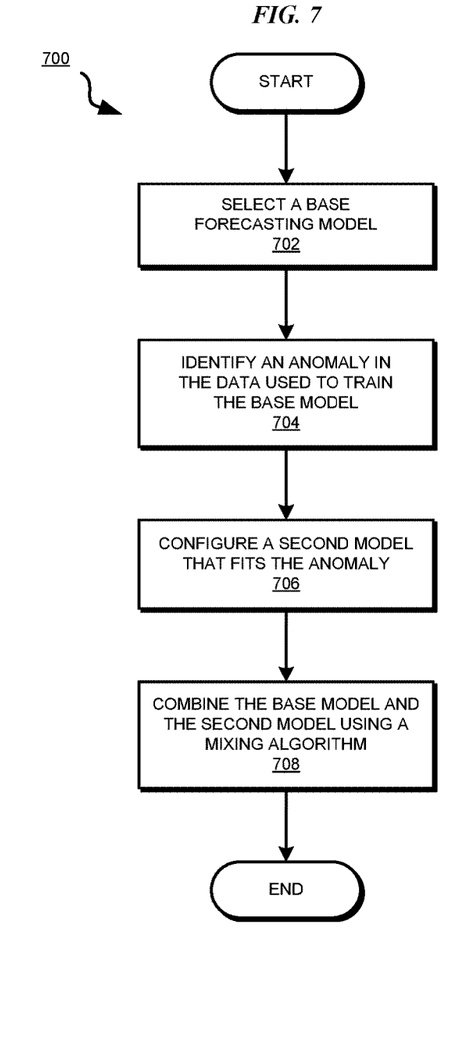
FIG. 7 depicts a flowchart of an example process for creating a weight adjustable composite model in accordance with an illustrative embodiment.

With reference to FIG. 7, this figure depicts a flowchart of an example process for creating a weight adjustable composite model in accordance with an illustrative embodiment. Process 700 an be implemented in application 302 in FIG. 3, to produce a weigh adjustable composite model, for example, composite model 406 in FIG. 4.

The application selects a base model (bloc 702). The application identifies an anomaly in the training data for the selected base model (block 704). The application configures a second model to fit the anomaly block 706). The application combined the trained base model and the configured second model using a mixing algorithm for weight adjustments (block 708). The application ends process 700 thereafter.

Figure 8:
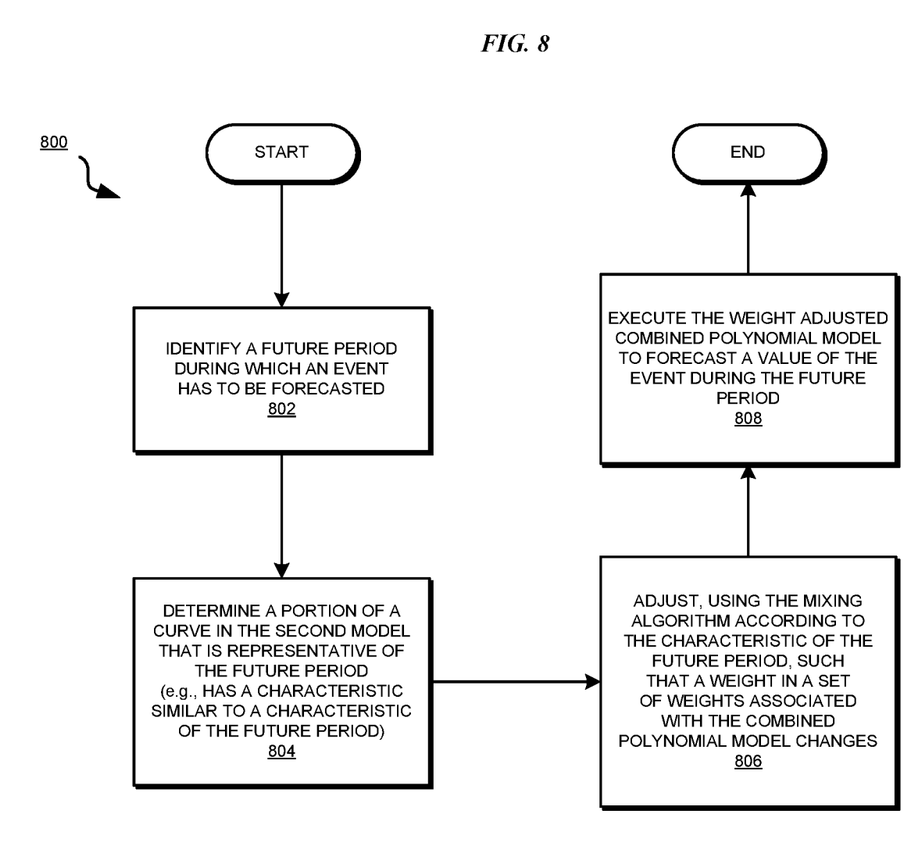
FIG. 8 depicts a flowchart of an example process for weight adjusted composite model for forecasting in anomalous environments in accordance with an illustrative embodiment.

With reference to FIG. 8, this figure depicts a flowchart of an example process for weight adjusted composite model for forecasting in anomalous environments in accordance with an illustrative embodiment. Process 800 can be implemented in application 302 in FIG. 3.

The application identifies a future period or a segment thereof during which an event has to be forecasted (block 802). The application determines a portion of a curve in a configured second model that is representative of the future period or the segment thereof (block 804). For example, the application identifies a period or a segment at least one of whose characteristics is similar to a corresponding characteristic of the future period or segment.

For example, if the future segment occurs between 2 and 3 PM, the application identifies a curve section that corresponds to the 2-3 PM time segment. Any suitable characteristic of the forecasting period or segment is similarly usable within the scope of the illustrative embodiments. A non-limiting and non-exhaustive list of some characteristics usable in this manner include a weather characteristic at that time, a traffic characteristic at that time, a skill of a person operating in that time, a factor affecting the event at that time, and the like.

The application adjusts one or more weights in the composite model using the mixing algorithm according to the one or more characteristics of the future period or segment during which the event is to be forecasted (block 806). The application executes the weight adjusted composite model to forecast a value of the event during the future period or time segment (block 808). The application ends process 800 thereafter.

Thus, a computer implemented method, system or apparatus, and computer program product are provided in the illustrative embodiments for weight adjusted composite model for forecasting in anomalous environments. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for event forecasting in anomalous environments, the method comprising:
   combining with a base forecasting model a second forecasting model to form a composite model, the base forecasting model configured to output a first forecast of an event in a time series, the second forecasting model configured to represent an anomalous portion of data in the time series wherein the anomalous portion comprises a non-uniformity in a distribution of the event in the time-series;
   combining with the composite model a mixing algorithm, the mixing algorithm configured to adjust a set of weights associated with the composite model;
   identifying a characteristic of a future period in which the event is to be forecasted;
   identifying a second period in a training data, wherein the characteristic of the future period matches a corresponding characteristic of the second period within a threshold;
   determining a portion of a curve representing a set of anomalous values in the training data during the second period, wherein the adjusting matches a curve representing the composite model during the future period with the portion of the curve representing the set of anomalous values in the training data during the second period;
   adjusting, responsive to identifying the future period, using the mixing algorithm, a subset of the set of weights to from a weight adjusted composite model; and
   executing, using a processor and a memory, the weight adjusted composite model to output a second forecast of the event during the future period in the anomalous portion of the time-series, wherein the second forecast has a better accuracy relative to the first forecast.

2. The method of claim 1, wherein the training data comprises past data of the time series.

3. The method of claim 1, wherein the characteristic comprises a factor that affects the event during the future period.

4. The method of claim 1, wherein the characteristic comprises a time of day.

5. The method of claim 1, wherein the second forecasting model comprises an equation whose curve fits, within a threshold, a curve formed by a set of values in the anomalous portion, and wherein the base forecasting model forecasts a value of the event in a non-anomalous portion of the data of the time series.

6. The method of claim 1, further comprising:
   configuring the set of weights in the composite model, wherein a weight in the set of weights is associated with an expression in an equation in the composite model, wherein adjusting the weight causes a curve of the equation to change and form a changed curve, and wherein the changed fits, within a threshold, a second curve formed by a set of values in an expected anomalous portion in the time series during the future period.

7. The method of claim 1, wherein the second forecasting model comprises an equation representing a seasonal change in the time series.

8. The method of claim 1, wherein the second forecasting model comprises an equation representing a level change in the time series.

9. The method of claim 1, wherein the second forecasting model comprises an equation representing a trend change in the time series.

10. The method of claim 1, wherein the method is embodied in a computer program product comprising one or more computer-readable tangible storage devices and computer-readable program instructions which are stored on the one or more computer-readable tangible storage devices and executed by one or more processors.

11. The method of claim 1, wherein the method is embodied in a computer system comprising one or more processors, one or more computer-readable memories, one or more computer-readable tangible storage devices and program instructions which are stored on the one or more computer-readable tangible storage devices for execution by the one or more processors via the one or more memories and executed by the one or more processors.

12. A computer program product for event forecasting in anomalous environments, the computer program product comprising:
a computer readable storage medium;
computer usable code stored on the computer readable storage medium, the computer usable code comprising:
program instructions to combine with a base forecasting model a second forecasting model to form a composite model, the base forecasting model configured to output a first forecast of an event in a time series, the second forecasting model configured to represent an anomalous portion of data in the time series wherein the anomalous portion comprises a non-uniformity in a distribution of the event in the time-series;
program instructions to combine with the composite model a mixing algorithm, the mixing algorithm configured to adjust a set of weights associated with the composite model;
program instructions to identify a characteristic of a future period in which the event is to be forecasted;
program instructions to identify a second period in a training data, wherein the characteristic of the future period matches a corresponding characteristic of the second period within a threshold;
program instructions to determine a portion of a curve representing a set of anomalous values in the training data during the second period, wherein the adjusting matches a curve representing the composite model during the future period with the portion of the curve representing the set of anomalous values in the training data during the second period;
program instructions to adjust, responsive to identifying a future period in which the event is to be forecasted, using the mixing algorithm, a subset of the set of weights to from a weight adjusted composite model; and
program instructions to execute, using a processor and a memory, the weight adjusted composite model to output a second forecast of the event during the future period in the anomalous portion of the time-series, wherein the second forecast has a better accuracy relative to the first forecast.

13. The computer program product of claim 12, wherein the training data comprises past data of the time series.

14. The computer program product of claim 12, wherein the characteristic comprises a factor that affects the event during the future period.

15. The computer program product of claim 12, wherein the characteristic comprises a time of day.

16. The computer program product of claim 12, wherein the second forecasting model comprises an equation whose curve fits, within a threshold, a curve formed by a set of values in the anomalous portion, and wherein the base forecasting model forecasts a value of the event in a non-anomalous portion of the data of the time series.

17. The computer program product of claim 12, further comprising:
program instructions to configure the set of weights in the composite model, wherein a weight in the set of weights is associated with an expression in an equation in the composite model, wherein adjusting the weight causes a curve of the equation to change and form a changed curve, and wherein the changed fits, within a threshold, a second curve formed by a set of values in an expected anomalous portion in the time series during the future period.

18. A computer system for event forecasting in anomalous environments, the computer system comprising:
a processor, a computer-readable memory and a computer readable storage medium;
computer usable code stored on the storage medium for execution by the processor via the memory, the computer usable code comprising:
program instructions to combine with a base forecasting model a second forecasting model to form a composite model, the base forecasting model configured to output a first forecast of an event in a time series, the second forecasting model configured to represent an anomalous portion of data in the time series wherein the anomalous portion comprises a non-uniformity in a distribution of the event in the time-series;
program instructions to combine with the composite model a mixing algorithm, the mixing algorithm configured to adjust a set of weights associated with the composite model;
program instructions to identify a characteristic of a future period in which the event is to be forecasted;
program instructions to identify a second period in a training data, wherein the characteristic of the future period matches a corresponding characteristic of the second period within a threshold;
program instructions to determine a portion of a curve representing a set of anomalous values in the training data during the second period, wherein the adjusting matches a curve representing the composite model during the future period with the portion of the curve representing the set of anomalous values in the training data during the second period;
program instructions to adjust, responsive to identifying a future period in which the event is to be forecasted, using the mixing algorithm, a subset of the set of weights to from a weight adjusted composite model; and
program instructions to execute, using a processor and a memory, the weight adjusted composite model to output a second forecast of the event during the future period in the anomalous portion of the time-series, wherein the second forecast has a better accuracy relative to the first forecast.

* * * * *